United States Patent
Koo et al.

(10) Patent No.: US 11,393,628 B2
(45) Date of Patent: Jul. 19, 2022

(54) MULTILAYER CERAMIC CAPACITOR

(71) Applicant: SAMSUNG ELECTRO-MECHANICS CO., LTD., Suwon-si (KR)

(72) Inventors: Kun Hoi Koo, Suwon-si (KR); Soung Jin Kim, Suwon-si (KR); Bon Seok Koo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 3 days.

(21) Appl. No.: 17/133,851

(22) Filed: Dec. 24, 2020

(65) Prior Publication Data
US 2021/0118616 A1 Apr. 22, 2021

Related U.S. Application Data

(63) Continuation of application No. 16/387,984, filed on Apr. 18, 2019, now Pat. No. 10,903,010.

(30) Foreign Application Priority Data

Nov. 29, 2018 (KR) .................. 10-2018-0150773
Feb. 18, 2019 (KR) .................. 10-2019-0018478

(51) Int. Cl.
*H01G 4/232* (2006.01)
*H01G 4/30* (2006.01)

(52) U.S. Cl.
CPC ............. *H01G 4/2325* (2013.01); *H01G 4/30* (2013.01)

(58) Field of Classification Search
CPC ...... H01G 4/248; H01G 4/012; H01G 4/1209; H01G 4/232; H01G 4/30; H01G 4/0085; H01G 4/1227; H01G 4/2325
See application file for complete search history.

(56) References Cited

U.S. PATENT DOCUMENTS

| 9,947,473 B2 | 4/2018 | Otani |
| 2007/0242416 A1* | 10/2007 | Saito ............ H01G 4/2325 361/321.1 |

(Continued)

FOREIGN PATENT DOCUMENTS

| JP | 2009-141292 A | 6/2009 |
| JP | 2011-054642 A | 3/2011 |

(Continued)

OTHER PUBLICATIONS

Japanese Office Action dated Aug. 25, 2020 issued in Japanese Patent Application No. 2019-078228 (with English translation).

(Continued)

*Primary Examiner* — Michael P McFadden
(74) *Attorney, Agent, or Firm* — Morgan, Lewis & Bockius LLP (57) ABSTRACT

A multilayer ceramic capacitor includes a body including a dielectric layer and an internal electrode and an external electrode disposed on one surface of the body. The external electrode includes an electrode layer, in contact with the internal electrode, a first intermetallic compound layer disposed on the electrode layer and made of $Cu_3Sn$, a first intermetallic compound, a second intermetallic compound layer disposed on the first intermetallic compound layer and made of $Cu_6Sn_5$, a second intermetallic compound, and a conductive resin layer disposed on the second intermetallic compound layer and including a plurality of metal particles, a base resin and a conductive metal having a melting point lower than a curing temperature of the base resin.

18 Claims, 3 Drawing Sheets

(56) References Cited

U.S. PATENT DOCUMENTS

| | | | |
|---|---|---|---|
| 2011/0051314 A1 | 3/2011 | Sakurai et al. | |
| 2013/0120898 A1* | 5/2013 | Park | H01G 4/30 |
| | | | 252/514 |
| 2013/0201601 A1* | 8/2013 | Nishisaka | H01G 4/306 |
| | | | 361/301.4 |
| 2015/0090483 A1* | 4/2015 | Moon | H01G 4/232 |
| | | | 29/25.42 |
| 2015/0279563 A1 | 10/2015 | Otani | |
| 2015/0279566 A1* | 10/2015 | Otani | H01G 4/30 |
| | | | 361/301.4 |
| 2016/0217930 A1 | 7/2016 | Yamaguchi et al. | |
| 2016/0379758 A1 | 12/2016 | Otani | |
| 2017/0178811 A1 | 6/2017 | Chun | |
| 2018/0166215 A1 | 6/2018 | Hamanka et al. | |
| 2018/0286583 A1 | 10/2018 | Onoue | |

FOREIGN PATENT DOCUMENTS

| | | |
|---|---|---|
| JP | 2016-136557 A | 7/2016 |
| JP | 2017-11145 A | 1/2017 |
| JP | 2018-98475 A | 6/2018 |
| KR | 10-2015-0086343 A | 7/2015 |
| KR | 10-2017-0000768 A | 1/2017 |
| WO | 2014/097823 A1 | 6/2014 |

OTHER PUBLICATIONS

U.S. Notice of Allowance dated Sep. 23, 2020 issued in U.S. Appl. No. 16/387,984.

* cited by examiner

MULTILAYER CERAMIC CAPACITOR

CROSS-REFERENCE TO RELATED APPLICATION(S)

This application is a continuation of U.S. patent application Ser. No. 16/387,984, filed on Apr. 18, 2019, which claims benefit of priority to Korean Patent Application Nos. 10-2018-0150773 filed on Nov. 29, 2018, and 10-2019-0018478 filed on Feb. 18, 2019 in the Korean Intellectual Property Office, the disclosures of which are incorporated herein by reference in their entireties.

TECHNICAL FIELD

The present disclosure relates to a multilayer ceramic capacitor (MLCC).

BACKGROUND

A multilayer ceramic capacitor (MLCC) is an important chip component used in industrial fields such as the communications, computing, home appliance, vehicle manufacturing industries and the like, as it is small-sized, can secure high capacity and can be easily installed. A multilayer ceramic capacitor is also used as a core passive element used in a variety of electric devices, electronic devices and information communication devices, such as cellular phones, computers, digital TVs, and the like.

Recently, as miniaturization and high performance have been implemented in electronic devices, multilayer ceramic capacitors have also tended to be miniaturized and to have high capacitance secured therein, and the importance of securing high reliability of the multilayer ceramic capacitor is increasing with this trend.

In order to secure high reliability of such a multilayer ceramic capacitor, in order to absorb tensile stress generated in mechanical or thermal environments to prevent cracks caused by stress, a technology in which a conductive resin layer is applied to an external electrode is disclosed.

The conductive resin layer may be formed using a paste including Cu, and a thermosetting resin, and serve to electrically and mechanically bond a sintered electrode layer and a plating layer of an external electrode of the multilayer ceramic capacitor, and serve to protect the multilayer ceramic capacitor from mechanical and thermal stress and bending impacts of the substrate, depending on a process temperature during circuit board mounting.

However, when the paste including Cu, and a thermosetting resin is used, physical properties of the reliability item may be changed due to bending impacts, thermal impacts, or moisture absorption such as moisture, chlorine water, or the like due to the basic physical properties of a material.

That is, when a paste including Cu, and a thermosetting resin is used, residual stresses may exist in a chip, and bending impacts may be transmitted to a ceramic body, as it is.

SUMMARY

An aspect of the present disclosure is to provide a multilayer ceramic capacitor (MLCC) having excellent moisture resistance reliability, having low internal equivalent series resistor (ESR), and having excellent resistance to mechanical stress.

According to an aspect of the present disclosure, a multilayer ceramic capacitor may include: a body including a dielectric layer; and an internal electrode and an external electrode disposed on one surface of the body. The external electrode may include: an electrode layer, in contact with the internal electrode; a first intermetallic compound layer disposed on the electrode layer and made of $Cu_3Sn$, a first intermetallic compound; a second intermetallic compound layer disposed on the first intermetallic compound layer and made of $Cu_6Sn_5$, a second intermetallic compound; and a conductive resin layer disposed on the second intermetallic compound, and including a plurality of metal particles, a base resin and a conductive metal having a melting point lower than that of a curing temperature of the base resin.

According to another aspect of the present disclosure, a multilayer ceramic capacitor may include: a body including a dielectric layer and an internal electrode; and an external electrode disposed on one surface of the body. The external electrode may include: an electrode layer, in contact with the internal electrode; a first intermetallic compound layer disposed on the electrode layer and made of a first intermetallic compound; a second intermetallic compound layer disposed on the first intermetallic compound layer and made of a second intermetallic compound; and a conductive resin layer disposed on the second intermetallic compound layer, and including a plurality of metal particles, a base resin, and a conductive metal having a melting point lower than that of a curing temperature of the base resin. The number of voids in the second intermetallic compound layer may be less than the number of voids in the first intermetallic compound layer.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described as follows with reference to the attached drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity. Further, in the drawings, elements having the same functions within the same scope of the inventive concept will be designated by the same reference numerals.

In the drawings, irrelevant descriptions will be omitted to clearly describe the present disclosure, and to clearly express a plurality of layers and areas, thicknesses may be magnified. The same elements having the same function within the scope of the same concept will be described with use of the same reference numerals. Throughout the specification, when a component is referred to as "comprise" or "comprising," it means that it may include other components as well, rather than excluding other components, unless specifically stated otherwise.

Figure 1:
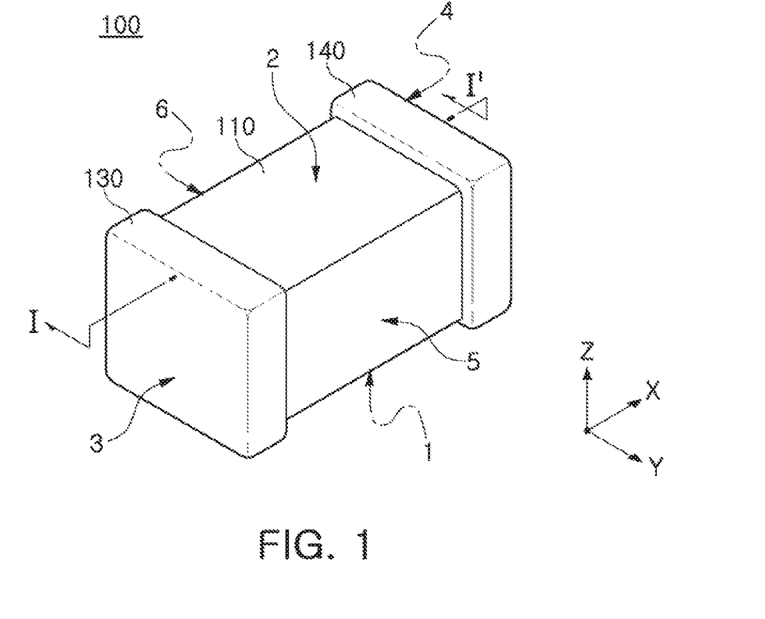
FIG. 1 is a perspective view schematically illustrating a multilayer ceramic capacitor according to an embodiment of the present disclosure.
Figure 2:
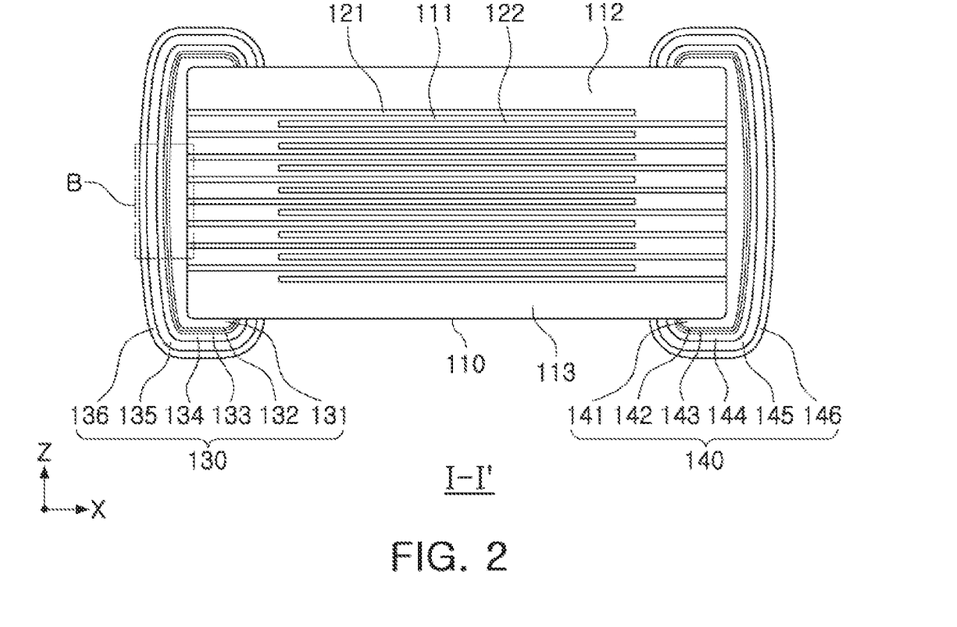
FIG. 2 is a cross-sectional view taken along the line I-I' of FIG. 1.

FIG. 1 is a perspective view schematically illustrating a multilayer ceramic capacitor according to an embodiment of the present disclosure. FIG. 2 is a cross-sectional view taken along the line I-I' of FIG. 1.

Referring to FIGS. 1 and 2, a multilayer ceramic capacitor 100 according to an embodiment of the present disclosure may include a body 110 and first and second external electrodes 130 and 140.

The body 110 may include an active portion serving as a portion contributing to capacity formation of a capacitor and upper and lower covers 112 and 113 respectively formed above and below the active portion as upper and lower margin portions.

In an embodiment of the present disclosure, the body 110 may not be particularly limited in terms of shape, but may have a substantially hexahedral shape.

That is, the body 110 may have a substantially hexahedral shape, though it is not a complete hexahedral shape due to the thickness differences and polishing of corner portions depending on disposition of internal electrodes.

In order to clearly explain an embodiment, when defining a direction of a hexahedron, an X direction may be defined as a first direction or a longitudinal direction, a Y direction may be defined as a second direction or a width direction, and a Z direction may be defined as a third direction, a thickness direction or stacking direction, in the drawings.

In addition, in the body 110, both surfaces opposing each other in the Z direction may be defined as first and second surfaces 1 and 2, both surfaces connected to the first and second surfaces 1 and 2 and opposing each other in the X direction may be defined as third and fourth surfaces 3 and 4, and both surfaces connected to the first and second surfaces 1 and 2, connected to the third and fourth surfaces and opposing each other in the Y direction may be defined as fifth and sixth surfaces 5 and 6. In this case, the first surface 1 may be amounting surface.

The active portion may have a structure in which a plurality of dielectric layers 111 and a plurality of first and second internal electrodes 121 and 122 are alternately stacked with the dielectric layers 111 interposed therebetween.

The dielectric layers 111 may include a ceramic powder having a high dielectric constant, for example, a barium titanate ($BaTiO_3$)-based or a strontium titanate ($SrTiO_3$)-based powder, and the present disclosure is not limited thereto.

In this case, the thickness of the dielectric layers 111 may be arbitrarily changed according to a capacitance design of the multilayer ceramic capacitor 100, and may be configured to be 0.1 to 10 μm after sintering, considering the size and the capacity of the body 110, but the present disclosure is not limited thereto.

The first and second internal electrodes 121 and 122 may be disposed to oppose each other with the dielectric layers 111 interposed therebetween.

The first and second internal electrodes 121 and 122 may be a pair of electrodes having different polarities, and may be formed by printing a conductive paste containing a conductive metal to a predetermined thickness on the dielectric layers 111 and be alternately exposed through the third and fourth surfaces 3 and 4 of the body 110 in the stacking direction of the dielectric layers 111 interposed therebetween, and may be electrically insulated with each other by the dielectric layers 111 disposed in the middle.

The first and second internal electrodes 121 and 122 may be electrically connected to first and second external electrodes 130 and 140 through electrode layers 131 and 141 formed on the third and fourth surfaces 3 and 4 of the body, respectively.

Therefore, when a voltage is applied to the first and second external electrodes 130 and 140, charges may be accumulated between the first and second internal electrodes 121 and 122 opposing each other. In this case, capacitance of the multilayer ceramic capacitor 100 may be proportional to an area of a region of the first and second internal electrodes 121 and 122, overlapping with each other.

Thicknesses of the first and second internal electrodes 121 and 122 may be determined depending on uses, and for example, may be determined to be within a range of 0.2 to 1.0 μm in consideration of the size and the capacity of the ceramic body 110, but the present disclosure is not limited thereto.

In addition, the conductive metal included in the first and second internal electrodes 121 and 122 may be nickel (Ni), copper (Cu), palladium (Pd), or an alloy thereof, however, the present disclosure is not limited thereto.

Upper and lower covers 112 and 113 may have the same material and configuration as the dielectric layer 111 of the active portion except for not including internal electrodes.

That is, the upper and lower covers 112 and 113 may be formed by stacking a single dielectric layer or two or more dielectric layers on upper and lower surfaces of the active portion in the Z direction, respectively, and may basically serve to prevent damages to the first and second internal electrodes 121 and 122 due to physical or chemical stresses.

According to an embodiment of the present disclosure, the first and second external electrodes 130 and 140 may include: electrode layers 131 and 141, in contact with the first and second internal electrodes 121 and 122; first intermetallic compound layers 132 and 142 disposed on the electrode layers 131 and 141 and made of a first intermetallic compound; second intermetallic compound layers 133 and 143 disposed on the first intermetallic compound layers 132 and 142 and made of a second intermetallic compound; and conductive resin layers 134 and 144 disposed on the second intermetallic compound layers 133 and 143 and including a plurality of metal particles, a base resin, and a conductive metal having a melting point lower than a curing temperature of the base resin.

Figure 3:
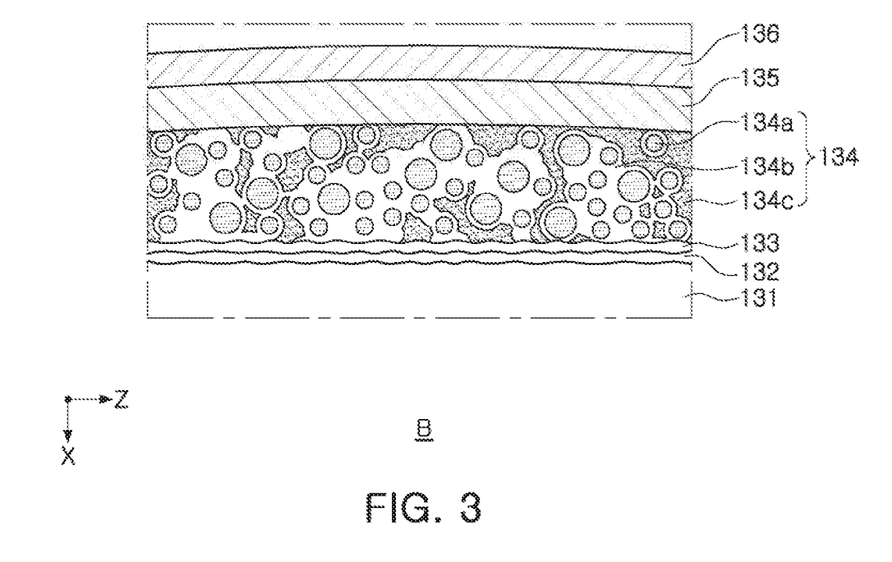
FIG. 3 is an enlarged cross-sectional view of region B of FIG. 2.

FIG. 3 is an enlarged cross-sectional view illustrating region B of FIG. 2.

Referring to FIG. 3, the first and second external electrodes 130 and 140 may include electrode layers 131 and 141, first intermetallic compound layers 132 and 142, second intermetallic compound layers 133 and 143, conductive resin layers 134 and 144, first plating layers 135 and 145, and second plating layers 136 and 146, respectively.

The first plating layers 135 and 145 may be nickel plating layers, and the second plating layers 136 and 146 may be tin plating layers.

The electrode layers 131 and 141 may serve to mechanically bond the body and the external electrode, and may serve to electrically and mechanically bond the internal electrode and the external electrode.

The electrode layers 131 and 141 may be in contact with the first and second internal electrodes 121 and 122, alternately exposed through one surface of the body 110 in the longitudinal direction to be directly connected, such that electrical conducting between the first and second external electrodes 130 and 140 and the first and second internal electrodes 121 and 122 may be secured.

That is, the electrode layers 131 and 141 may be provided with the first electrode layer 131 and the second electrode layer 141, and the first electrode layer 131 may be in contact with the first internal electrode 121 exposed through one surface of the body 110 in the longitudinal direction to be directly connected thereto, such that electrical conducting between the first external electrode 130 and the first internal electrode 121 may be secured.

In addition, the second electrode layer 141 may be in contact with the second internal electrode 122 exposed through the other surface of the body 110 in the longitudinal direction to be directly connected thereto, such that electrical conducting between the second external electrode 140 and the second internal electrode 122 may be secured.

The electrode layers 131 and 141 may include a metal component, such as nickel (Ni), copper (Cu), palladium (Pd), gold (Au), or an ally thereof. More preferably, copper sintered with the metal component may be used.

Meanwhile, the thickness of the electrode layer is not particularly limited, but, may be 0.5 to 5 µm.

In this case, the electrode layers 131 and 132 may extend from the third and fourth surfaces 3 and 4 of the body 110 to portions of the first and second surfaces 1 and 2 of the body 110, respectively.

In addition, the electrode layers 131 and 132 may extend from the third and fourth surfaces 3 and 4 of the body to portions of the fifth and sixth surfaces 5 and 6 of the body 110.

The first intermetallic compound layers 132 and 142 may be disposed on the electrode layers 131 and 141, and made of a first intermetallic compound.

The first intermetallic compound layers 132 and 142 may serve to improve moisture resistance reliability and electrical connectivity. The first intermetallic compound layers 132 and 142 may be disposed to cover the electrode layers 131 and 141.

According to an embodiment of the present disclosure, the electrode layers 131 and 141 may be formed, and a paste having a low melting point may be applied to and sintered on the electrode layers 131 and 141 to form the external electrodes 130 and 140.

Thus, metal particles contained in the electrode layers 131 and 141 and metal particles having a low melting point contained in the paste may be mutually diffused to form a first intermetallic compound, and the first intermetallic compound may be formed between the electrode layers 131 and 141 and the conductive resin layers 134 and 144 in a layer form to form the first intermetallic compound layers 132 and 142.

In this case, the first intermetallic compound may be $Cu_3Sn$. That is, it may be $Cu_3Sn$ formed by coupling Cu, metal particles contained in the electrode layers 131 and 141 and Sn, metal particles having a low melting point, contained in the paste.

The moisture resistance reliability and the electrical connectivity may be improved by the first intermetallic compound layers 132 and 142.

As in the related art, when a conductive resin layer containing copper (Cu), tin (Sn), and an epoxy resin is formed on electrode layers containing sintered copper, it is known that only an intermetallic compound layer of $Cu_3Sn$ is formed.

However, when only the first layer of $Cu_3Sn$ is formed between the electrode layers 131 and 141 containing the sintered copper and the conductive resin layers 134 and 144 to be described later, as an intermetallic compound layer, sufficient effects may not be obtained in terms of mechanical strength or moisture resistance reliability.

Specifically, when only the intermetallic compound layer of $Cu_3Sn$ is formed between the electrode layers and the conductive resin layers, Kirkendal voids may be formed to adversely affect the mechanical strength and moisture resistance reliability.

When the Kirkendal voids are formed in the form of pores, at an interface between the electrode layers 131 and 141 and the first intermetallic compound layers 132 and 142, $Cu_3Sn$, moisture resistance failure may occur along the pores, and due to the existence of pores, the mechanical strength may be lowered.

According to an embodiment of the present disclosure, an intermetallic compound may be formed between the electrode layers and the conductive resin layers in two layer form, thereby improving moisture resistance reliability, having low ESR, and improving resistance to mechanical stress such as bending strength and chemical resistance characteristics.

That is, the intermetallic compound layer may be disposed between the electrode layers 131 and 141 containing the sintered copper and the conductive resin layers 134 and 144 described later in two layer form, and the first intermetallic compound layers 132 and 142, $Cu_3Sn$, and the second intermetallic compound layers 133 and 145, $Cu_6Sn_5$, may be formed on the first intermetallic compound layers 132 and 142.

Specifically, according to an embodiment of the present disclosure, the first intermetallic compound may be formed between the electrode layers 131 and 141 and the conductive resin layers 134 and 144 in a layer form to form first intermetallic compound layers 132 and 142, and the second intermetallic compound may be formed on the first intermetallic compound layers 132 and 142 in a layer form to form the second intermetallic compound layers 133 and 143.

The second intermetallic compound may be $Cu_6Sn_5$. That is, it may be $Cu_6Sn_5$ by bonding Cu, a metal particle contained in the electrode layers 131 and 141 and Sn, a metal particle having a low melting point contained in the paste.

The second intermetallic compound, $Cu_6Sn_5$, may have a very lower moisture permeability compared to the first intermetallic compound, $Cu_3Sn$.

That is, in the case of an intermetallic compound, $Cu_3Sn$, many micropores may be generated, and the micropores may be known as Kirkendal voids as described above.

When only the intermetallic compound, $Cu_3Sn$, is formed in a layer form, it may be vulnerable to moisture resistance or mechanical strength.

However, the intermetallic compound, $Cu_6Sn_5$, may have little micropores. As described above, $Cu_6Sn_5$, a second intermetallic compound having little micropores, may have a very lower moisture permeability compared to the first intermetallic compound, $Cu_3Sn$.

In an embodiment of the present disclosure, the second intermetallic compound layers 133 and 143, $Cu_6Sn_5$, may be formed on the first intermetallic compound layers 132 and 142 by forming the conductive resin layers 134 and 144, firstly, by using a conductive paste of an Ag—Sn based epoxy resin instead of a conductive paste of a Cu—Sn based epoxy resin, as that of in the related art.

In addition, the conductive resin layers 134 and 144 may be formed by using the conductive paste of the Ag—Sn based epoxy resin, but by adjusting an amount of a Sn solder, the second intermetallic compound layers 133 and 143, $Cu_6Sn_5$, may be formed on the first intermetallic compound layers 132 and 142. Details thereof will be described later.

According to an embodiment of the present disclosure, a ratio of a thickness of the first intermetallic compound layers 132 and 142 compared to a thickness of the second intermetallic compound layers 133 and 143 may be 0.1 to 1.0.

The ratio of the thickness of the first intermetallic compound layers 132 and 142 compared to the thickness of the second intermetallic compound layers 133 and 143 may satisfy 0.1 to 1.0, such that the second intermetallic compound layers 133 and 143, $Cu_6Sn_5$, having much lower moisture permeability rate than the first intermetallic compound layers 132 and 142, $Cu_3Sn$, may be thicker to improve moisture resistance reliability, have low ESR, and improve resistance to mechanical strength such as bending strength, or the like and chemical resistance characteristics.

When the ratio of the thickness of the first intermetallic compound layers 132 and 142 compared to the thickness of the second intermetallic compound layers 133 and 143 exceeds 1.0, the thickness of the first intermetallic compound layers 132 and 142, $Cu_3Sn$, may be thicker than the thickness of the second intermetallic compound layers 133 and 143, $Cu_6Sn_5$, such that the moisture resistance reliability and the mechanical characteristics may be deteriorated.

The ratio of the number of voids in the second intermetallic compound layers 133 and 143 compared to the number of voids in the first intermetallic compound layers 132 and 142 may be less than 1.0.

The ratio of the number of voids in the second intermetallic compound layers 133 and 143 compared to the number of voids in the first intermetallic compound layers 132 and 142 may be less than 1.0, thereby improving moisture resistance reliability, having low ESR, and improving resistance to mechanical stress such as bending strength and chemical resistance characteristics.

That is, the second intermetallic compound layers 133 and 143 having a much smaller number of voids than the number of voids in the first intermetallic compound layers 132 and 142 may be disposed above the first intermetallic compound layers 132 and 142, thereby improving the moisture resistance reliability and also improving mechanical strength. The second intermetallic compound layers 133 and 143 may have the number of voids, much smaller than the number of voids in the first intermetallic compound layers 132 and 142, and also the second intermetallic compound layers 133 and 143 may have little voids.

The conductive resin layers 134 and 144 may be disposed on the second intermetallic compound layers 133 and 143, and may include a plurality of metal particles 134a, a base resin 134c and a conductive metal 134b having a melting point lower than a curing temperature of the base resin 134c.

The plurality of metal particles 134a having a melting point higher than the curing temperature of the base resin 134c may be silver (Ag), and the conductive metal 134b having a melting point lower than the curing temperature of the base resin 134c may be tin (Sn).

Sizes of the plurality of metal particles 134a may be 0.5 to 3.0 μm, but is not necessarily limited thereto.

The conductive resin layers 134 and 144 may be disposed on the second intermetallic compound layers 133 and 143, and may include a plurality of metal particles 134a, a conductive metal 134b having a melting point lower than a curing temperature of a base resin 134c, surrounding the plurality of metal particles 134a, and the base resin 134c. The conductive resin layers 134 and 144 may serve to electrically and mechanically bond the first intermetallic compound layers 132 and 142 and the second intermetallic compound layers 133 and 143 and the first plating layer, absorb tensile stress generated in mechanical or thermal environments when mounting a multilayer ceramic capacitor on a substrate, to prevent a crack occurring, and serve to protect the multilayer ceramic capacitor from bending impacts of the substrate.

The conductive metal 134b surrounding the plurality of metal particles 134a may have a melting point lower than the curing temperature of the base resin 134c.

The conductive metal 134b may serve to surround the plurality metal particles 134a in a molten state to connect with each other. Thus, stresses in the body 110 may be significantly reduced, and high temperature load and moisture resistance load characteristics may be improved.

That is, since the conductive metal 134b contains a metal having a melting point lower than a curing temperature of a base resin 134c, the metal having a melting point lower than the curing temperature of the base resin 134c may be melted during the drying and curing process, and may surround the metal particles 134a. In this case, the conductive metal 134b may preferably include a low melting point metal at 300° C. or lower.

For example, Sn, having a melting point of 213 to 220° C. may be formed. Sn may be melted during the drying and curing process, and the molten Sn may be wetted by a capillary phenomenon of metal particles having a high melting point such as Ag, and the metal particles 134a may be surrounded.

According to an embodiment of the present disclosure, a content of conductive metal 134b having a melting point lower than the curing temperature of the base resin 134c may be 10 wt % or more and less than 33 wt %.

The first intermetallic compound layers 132 and 142, $Cu_3Sn$, and the second intermetallic compound layers 133 and 143, $Cu_6Sn_5$, may be stably formed by setting the content of Sn to 10 wt % or more and less than 33 wt % as the conductive metal 134b having a melting point lower than the curing temperature of the base resin 134c. Thus, an external protrusion due to Sn unreacted may not occur, thereby improving reliability.

Particularly, by setting the content of the Sn to 10 wt % or more and less than 33 wt %, the first intermetallic compound layers 132 and 142, $Cu_3Sn$, and the second intermetallic compound layers 133 and 143, $Cu_6Sn_5$, may be stably formed. Thus, the moisture resistance reliability and the reliability in terms of mechanical aspects may be further improved compared to a case in which it is made of only the intermetallic compound layers, $Cu_3Sn$.

When the content of Sn as the conductive metal 134c having a melting point lower than the curing temperature of the base resin 134c is less than 10 wt %, the first intermetallic compound layers 132 and 142, $Cu_3Sn$, and the second intermetallic compound layers 133 and 143, $Cu_6Sn_5$, may not be stably formed.

Meanwhile, when the content of Sn as the conductive metal 134b having a melting point lower than the curing temperature of the base resin 134c, is 33 wt % or more, a phenomenon of protruding outward due to the Sn unreacted may occur.

The base resin 134c may include a thermosetting resin having electrical insulation properties.

In this case, the thermosetting resin may be, for example, an epoxy resin, and the present disclosure is not limited thereto.

The base resin 134c may serve to mechanically bond the first intermetallic compound layers 132 and 142, the second intermetallic compound layers 133 and 143 and the first plating layers 135 and 145.

The first plating layers 135 and 145 and second plating layers 136 and 146 may be sequentially disposed on the conductive resin layers 134 and 144.

In this case, the first plating layers 135 and 145 may be, for example, nickel plating layers, and the second plating layers 136 and 146 may be tin plating layers. The nickel plating layers 135 and 145 may be in contact with the conductive resin layers 134 and 144.

Figure 4:
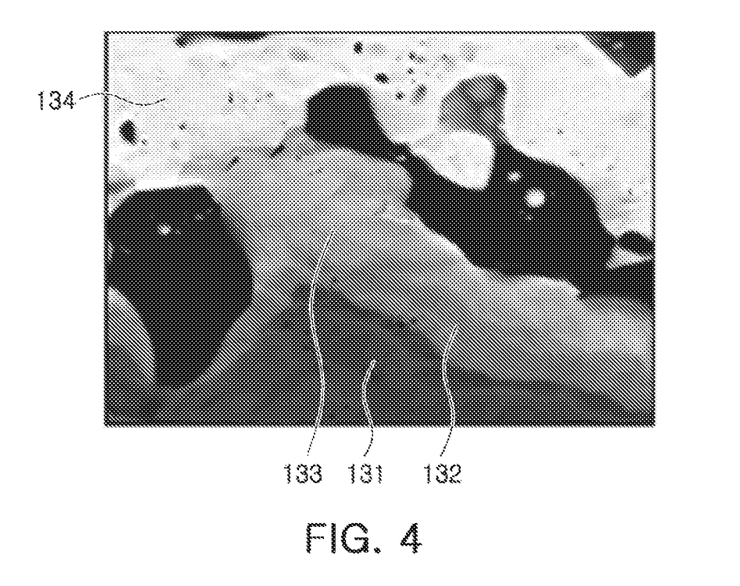
FIG. 4 is an image taken from a cross-section in a vicinity of region B of the multilayer ceramic capacitor according to an embodiment of the present disclosure by a microscope.

FIG. 4 is an image taken from a cross-section in a vicinity of the region B of the multilayer ceramic capacitor according to an embodiment of the present disclosure by a microscope.

Referring to FIG. 4, it can be confirmed that a first intermetallic compound may be formed in a layer form between an electrode layer 131 and a conductive resin layer 134 to form a first intermetallic compound layer 132 and a second intermetallic compound may be formed in a layer form on the first intermetallic compound layer 132 to form a second intermetallic compound layer 133.

A multilayer ceramic capacitor 100 according to another aspect of the present disclosure may include a body 110 including a dielectric layer 111 and internal electrodes 121 and 122 and external electrodes 130 and 140 disposed on one surface of the body 110. The external electrodes 130 and 140 may include electrode layers 131 and 141, in contact with the internal electrodes 121 and 122, first intermetallic compound layers 132 and 142 disposed on the electrode layers 131 and 141 and made of a first intermetallic compound, second intermetallic compound layers 133 and 143 disposed on the first intermetallic compound layers 132 and 142 and made of a second intermetallic compound, and conductive resin layers 134 and 144 disposed on the second intermetallic compound layers 133 and 143, and including a plurality of metal particles, a base resin and a conductive metal having a melting point lower than the curing temperature of the base resin. The number of voids in the second intermetallic compound layers 133 and 143 may be smaller than the number of voids in the first intermetallic compound layers 132 and 142.

The first intermetallic compound layer may be $Cu_3Sn$, and the second intermetallic compound layer may be $Cu_6Sn_5$.

As described above, since the first intermetallic compound layer may be $Cu_3Sn$, and the second intermetallic compound layer may be $Cu_6Sn_5$, the number of voids in the second intermetallic compound layers 133 and 143 may be smaller than the number of voids in the first intermetallic compound layers 132 and 142.

According to another aspect of the present disclosure, the ratio of the moisture permeability of the second intermetallic compound layers 133 and 143 compared to the moisture permeability of the first intermetallic compound layers 132 and 142 may be 0.5 or less, but is not limited thereto, and may be as low as 0.2 or less.

Hereinafter, a method of manufacturing of a multilayer ceramic capacitor according to an embodiment of the present disclosure will be described in detail, but the present disclosure is not limited thereto. A description overlapping the description of the above-described multilayer ceramic capacitor, among descriptions of the method of manufacturing of the multilayer ceramic capacitor of the present disclosure, will be omitted.

In the method of manufacturing the multilayer ceramic capacitor according to the present embodiment, a slurry including a powder such as barium titanate ($BaTiO_3$), or the like, may be applied to a carrier film and then dried to prepare a plurality of ceramic green sheets.

The ceramic green sheets may be prepared by mixing a ceramic powder, a binder and a solvent to prepare a slurry, and the ceramic green sheets may be prepared by forming the slurry into a sheet having a thickness of several μm by a doctor blade method, or the like.

Next, a conductive paste for internal electrodes containing a conductive metal such as a nickel power, or the like on the green sheets may be applied by a screen printing method, or the like to form an internal electrode.

Then, a plurality of green sheets on which the internal electrodes are printed may be stacked to form a stacked body. In this case, a plurality of green sheets on which internal electrodes are not printed may be stacked on upper and lower surfaces of the stacked body to form a cover.

The body may include a dielectric layer, an internal electrode and a cover. The dielectric layer may be formed by sintering a green sheet on which an internal electrode is printed, and the cover may be formed by sintering a green sheet on which an internal electrode is not printed.

The internal electrode may be formed of first and second internal electrodes having different polarities.

Next, an electrode layer may be formed on third and fourth surfaces 3 and 4 of the body, respectively, such that the body is electrically connected to the first and second internal electrodes, respectively, after sintering the stacked body to prepare the body.

The electrode layer may be formed by applying the a conductive paste for forming an external electrode containing copper and glass, conductive metals, to one surface and the other surface of the body.

The electrode layer may be formed by a dipping method, but is not limited thereto, and the electrode layer may be formed by a method of transferring a sheet, an electroless plating method, or a sputtering method.

Next, a conductive paste containing a plurality of metal particles, a base resin, and a conductive metal having a melting point lower than a curing temperature of the base resin may be applied to and dried on the electrode layer, and followed by curing heat treatment to form a first intermetallic compound layer made of a first intermetallic compound, a second intermetallic compound disposed on the first intermetallic compound layer, and made of a second intermetallic compound, and a conductive resin layer.

The conductive paste may include a metal particle, a thermosetting resin, and a low melting point metal having a melting point lower than that of the thermosetting resin. For example, the paste may be prepared by mixing an Ag powder, a Sn-based solder powder, and a thermosetting resin, and then dispersing the mixture using a 3-roll mill. The Sn-based solder powder may include at least one or more selected from Sn, $Sn_{96.5}Ag_{3.0}Cu_{0.5}$, $Sn_{42}Bi_{58}$ and $Sn_{72}Bi_{28}$, and the Ag contained in the Ag powder may have a particle size of 0.5 to 3 μm, but the present disclosure is not limited thereto. The conductive paste may not include Cu powder. In a case in which Cu powder is included in the conductive paste, a content, such as a weight percentage, of the Cu powder with respect to the paste may be less than that of the Ag powder with respect to the paste.

The Sn-based solder powder may be contained in an amount of 10 wt % or more and less than 33 wt % based on the total weight of the paste.

The first and second intermetallic compound layers and the conductive resin layer may be formed by applying the low melting point paste to an outside of the electrode layer, drying and curing the paste.

The thermosetting resin may include, for example, an epoxy resin, but the present disclosure is not limited thereto. For example, the thermosetting resin may be a bisphenol A resin, a glycol epoxy resin, a novolak epoxy resin or a resin liquid at room temperatures due to the molecular weight among derivatives thereof.

A step of forming a first plating layer and a second plating layer on the conductive resin layer may be further included.

For example, a nickel plating layer, the first plating layer, may be formed on the conductive resin layer, and a tin plating layer, the plating layer, may be formed on the nickel plating layer.

According to an embodiment, the conductive resin layer may be formed using a conductive paste obtained by mixing an Ag powder, a Sn-based powder and a thermosetting resin as described above, according to Comparative Example 1, a conductive resin layer may be formed using an Ag conductive paste obtained by mixing an Ag powder and a thermosetting resin, and according to Comparative Example 2, a conductive resin layer may be formed using a Cu conductive paste obtained by mixing a Cu powder, a Sn-based solder powder and a thermosetting resin.

The Comparative Example 1 and the Comparative Example 2 correspond to the related art.

Table 1 below is a table comparing transmittance and moisture permeability according to the Comparative Examples 1 and 2 and Embodiment.

The test of transmittance and moisture permeability was performed under a condition of 37.8° C. and relative humidity of 100%.

TABLE 1

| Sample | Thickness (μm) | Transmittance (mg/[m² · day]) | Moisture Permeability (mg/[m² · day]) |
| --- | --- | --- | --- |
| Comparative Example 1 | 150 | 26855 | 4.0284 |
| Comparative Example 2 | 140 | 3755 | 0.5258 |
| Embodiment | 105 | −10 | — |

Referring to the [Table 1], it can be seen that the Embodiment of the present disclosure shows that it has almost no moisture permeability, as compared to the Ag conductive paste (Comparative Example 1) and the Cu conductive paste (Comparative Example 2) in the related art.

Figure 5:
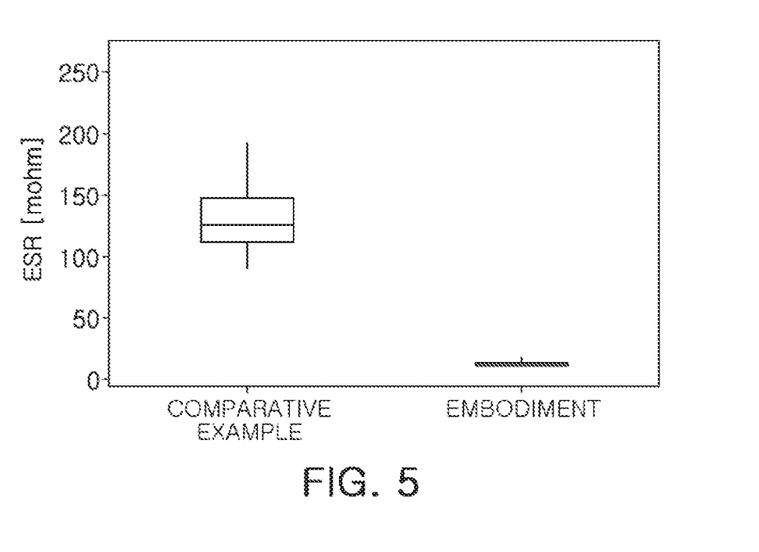
FIG. 5 is a graph illustrating an ESR value measured for an embodiment and a comparative example of the present disclosure.

FIG. 5 is a graph illustrating ESR values measured for Embodiments and Comparative Examples of the present disclosure.

Referring to FIG. 5, it can be seen that the ESR values in the Embodiment is significantly lower than that of the Comparative Example of the present disclosure.

In FIG. 5, the Comparative Example shows a case in which the Ag conductive paste corresponding to the case in the Comparative Example 1 is applied. It can be seen that, in the case of the embodiment in which the conductive resin layer is formed using a conductive paste obtained by mixing the Ag powder, the Sn-based powder and the thermosetting resin, the ESR values are remarkably low compared to the case in the Comparative Example.

As set forth above, according to an embodiment of the present disclosure, a multilayer ceramic capacitor may have a structure in which an electrode layer, a first intermetallic compound layer, a second intermetallic compound layer and a conductive resin layer are sequentially stacked. An intermetallic compound layer may be formed between the electrode layer and the conductive resin layer in two layers, such that moisture resistance reliability may be improved, ESR may be low, resistance to mechanical stress such as bending strength, or the like and chemical resistance characteristics may be improved.

While the exemplary embodiments have been shown and described above, it will be apparent to those skilled in the art that modifications and variations could be made without departing from the scope of the present invention as defined by the appended claims.

What is claimed is:

1. A multilayer ceramic capacitor, comprising:
a body including a dielectric layer and an internal electrode; and
an external electrode disposed on one surface of the body, wherein the external electrode comprises:
an electrode layer, in contact with the internal electrode;
a first intermetallic compound layer disposed on the electrode layer and made of $Cu_3Sn$, a first intermetallic compound;
a second intermetallic compound layer disposed on the first intermetallic compound layer and made of $Cu_6Sn_5$, a second intermetallic compound; and
a conductive resin layer disposed on the second intermetallic compound layer and including a plurality of metal particles, a base resin and a conductive metal.

2. The multilayer ceramic capacitor of claim 1, wherein the plurality of metal particles are silver (Ag), and the conductive metal is tin (Sn).

3. The multilayer ceramic capacitor of claim 2, wherein the conductive resin layer does not contain Cu particles.

4. The multilayer ceramic capacitor of claim 2, wherein the conductive resin layer contains Cu particles, and
in the conducive resin layer, a content of the Cu particles is less than a content of the Ag particles.

5. The multilayer ceramic capacitor of claim 1, wherein a ratio of a thickness of the first intermetallic compound layer to a thickness of the second intermetallic compound layer is 0.1 to 1.0.

6. The multilayer ceramic capacitor of claim 1, wherein a size of the plurality of metal particles is 0.5 to 3.0 μm.

7. The multilayer ceramic capacitor of claim 1, wherein a content of the conductive metal is 10 wt % or more and less than 33 wt %.

8. The multilayer ceramic capacitor of claim 1, wherein a ratio of the number of voids in the second intermetallic compound layer to the number of voids in the first intermetallic compound layer is less than 1.0.

9. A multilayer ceramic capacitor, comprising:
a body including a dielectric layer and an internal electrode; and
an external electrode disposed on one surface of the body, wherein the external electrode comprises:
an electrode layer, in contact with the internal electrode;
a first intermetallic compound layer disposed on the electrode layer and made of a first intermetallic compound;

a second intermetallic compound layer disposed on the first intermetallic compound layer and made of a second intermetallic compound; and a conductive resin layer disposed on the second intermetallic compound layer and including a plurality of metal particles, a base resin and a conductive metal, wherein the number of voids in the second intermetallic compound layer is less than the number of voids in the first intermetallic compound layer.

10. The multilayer ceramic capacitor of claim 9, wherein the plurality of metal particles are silver (Ag), and the conductive metal is tin (Sn).

11. The multilayer ceramic capacitor of claim 10, wherein the conductive resin layer does not contain Cu particles.

12. The multilayer ceramic capacitor of claim 10, wherein the conductive resin layer contains Cu particles, and in the conducive resin layer, a content of the Cu particles is less than a content of the Ag particles.

13. The multilayer ceramic capacitor of claim 9, wherein the first intermetallic compound is $Cu_3Sn$.

14. The multilayer ceramic capacitor of claim 9, wherein the second intermetallic compound is $Cu_6Sn_5$.

15. The multilayer ceramic capacitor of claim 9, wherein the ratio of a thickness of the first intermetallic compound layer to a thickness of the second intermetallic compound layer is 0.1 to 1.0.

16. The multilayer ceramic capacitor of claim 9, wherein a size of the plurality of metal particles is 0.5 to 3.0 μm.

17. The multilayer ceramic capacitor of claim 9, wherein the content of the conductive metal is 10 wt % or more and less than 33 wt %.

18. The multilayer ceramic capacitor of claim 9, wherein a ratio of moisture permeability of the second intermetallic compound layer to moisture permeability of the first intermetallic compound layer is 0.5 or less.

* * * * *